United States Patent

Shiow-Miin

[11] Patent Number: 5,615,579
[45] Date of Patent: Apr. 1, 1997

[54] GEAR STRUCTURE FOR REDUCTION GEARS

[76] Inventor: Perng Shiow-Miin, No. 22, Shean Fen Lin, Dah Lin Tsuen, Beei Puu Country, Shin Jwu Hsien, Taiwan

[21] Appl. No.: 460,682

[22] Filed: Jun. 2, 1995

[51] Int. Cl.⁶ .................................................. F16H 55/06
[52] U.S. Cl. ............................ 74/462; 74/457; 475/180
[58] Field of Search ...................... 74/457, 462; 475/162, 475/180

[56] References Cited

U.S. PATENT DOCUMENTS

| | | | |
|---|---|---|---|
| 1,682,563 | 8/1928 | Hill | 74/462 |
| 2,666,336 | 1/1954 | Hill et al. | 74/462 |
| 2,750,807 | 6/1956 | Miyazaki | 74/457 |
| 4,398,874 | 8/1983 | Eisenmann | 475/180 X |
| 4,673,342 | 6/1987 | Saegusa | 475/180 X |
| 4,915,604 | 4/1990 | Nagai | 74/462 X |
| 4,922,781 | 5/1990 | Peiji | 74/462 |
| 5,163,826 | 11/1992 | Cozens | 74/462 X |
| 5,484,345 | 1/1996 | Fukaya | 475/162 |

Primary Examiner—Charles A. Marmor
Assistant Examiner—Peter Kwon
Attorney, Agent, or Firm—Donald C. Casey, Esq.

[57] ABSTRACT

A gear structure including an internal gear and an external gear meshed together and moved relative to each other through a rotary motion, the radius of the root arcs of the teeth of the external gear being M, which is the ratio between the diameter of the crest and the number of teeth, and being the line of arc in tangent with the crest arcs of each two adjacent teeth, the tooth form curve of the internal gear being obtained by connecting all engaging points at the crest arcs and root arcs of the external gear.

1 Claim, 6 Drawing Sheets

GEAR STRUCTURE FOR REDUCTION GEARS

BACKGROUND OF THE INVENTION

The present invention relates to reduction gears, and relates more particularly to such a gear structure for a reduction gear which comprises an internal gear and an external gear meshed together and moved relative to each other through a rotary motion, wherein the radius of the root arcs of the teeth of the external gear is M, which is the ratio between the diameter of the crest and the number of teeth, and is the line of arc in tangent with the crest arcs of each two adjacent teeth; the tooth form curve of the external gear is obtained by connecting all lines of arc; the tooth form curve of the internal gear is obtained by connecting all engaging points at the crest arcs and root arcs of the external gear.

Reduction gears are intensively used in machinery for power output transmission. Conventional reduction gears commonly use planet gears to reduce the speed of output power in the same direction. These reduction gears commonly comprised of an internal gear and an external gear of different numbers of teeth meshed together and moved relative to each other through an eccentric rotary motion. However, using planet gears to reduce the speed of output power in the same direction has drawbacks. Because a planet gear achieves rotary motion by means of the engagement of gear teeth, friction loss between contact surfaces affects the working efficiency of the mechanism. If the number of teeth of the internal gear is close to that of the external gear, an interference tends to occur, therefore the application is limited. In order not to occupy much installation space, the thickness of the root of each tooth must be limited to a certain value, which results in weak structural strength of the teeth, and therefore the teeth of the gears tend to be broken. Furthermore, because the precision of the specifications of the teeth is critical, the processing process of the gears is complicated.

SUMMARY OF THE INVENTION

The present invention has been accomplished to provide a gear structure of reduction gears which achieves high performance and is durable in use. According to one aspect of the present invention, the radius of the root arcs of the teeth of the external gear is M, which is the ratio between the diameter of the crest and the number of teeth, and is the line of arc in tangent with the crest arcs of each two adjacent teeth.

According to another aspect of the present invention, the tooth form curve of the internal gear is obtained by connecting all engaging points at the crest arcs and root arcs of the external gear.

DETAILED DESCRIPTION OF THE PREFERRED EMBODIMENT

The principle of the present invention is to let the contact between the internal gear and the external gear be a rotary contact and to achieve speed reduction by means of the utilization of the spinning or eccentric rotation of the external gear or internal gear.

Figure 1:
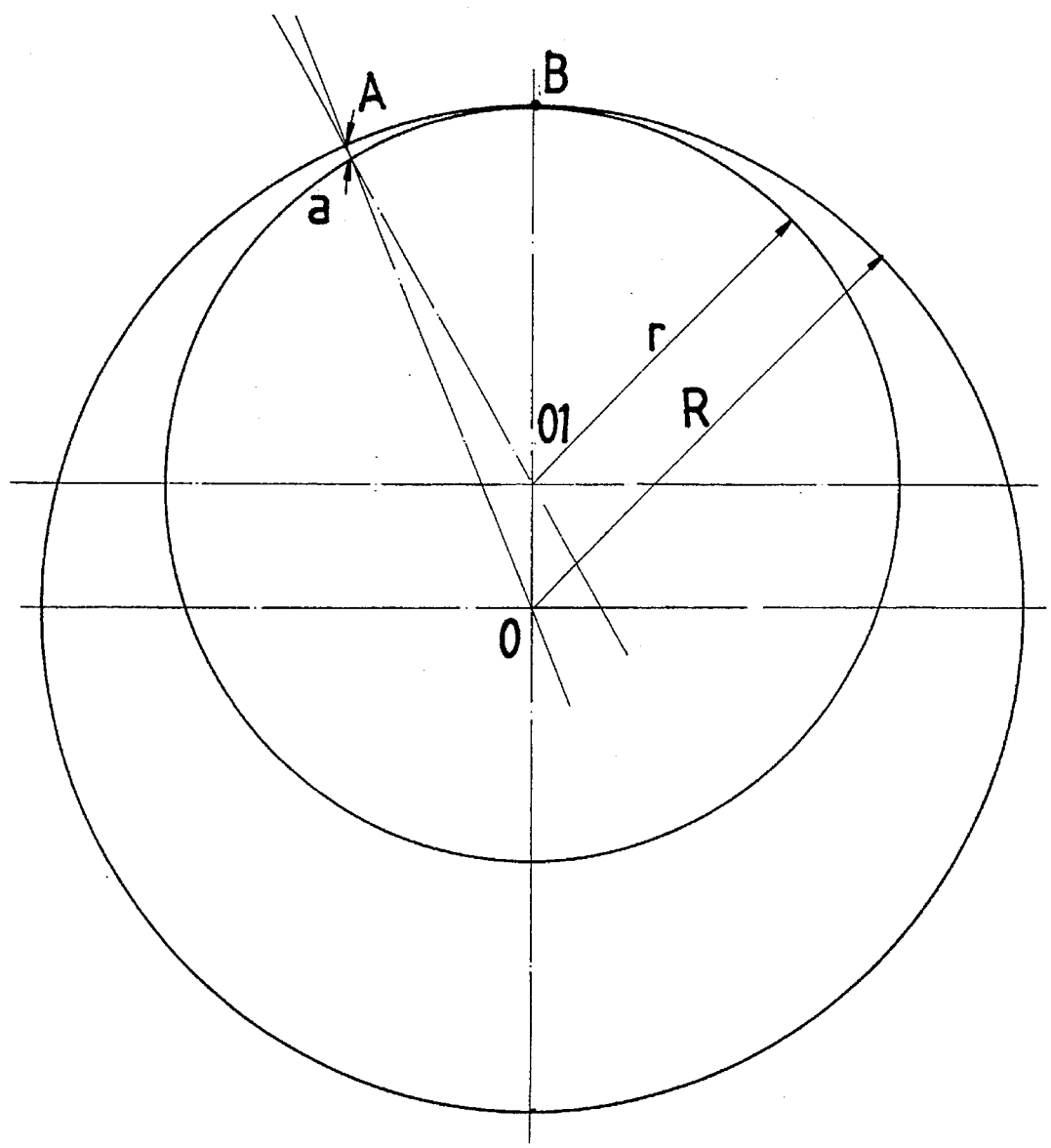
FIG. 1 is a schematic drawing explaining the operation of the gear structure according to the present invention.

FIG. 1 explains the operation of the gear structure according to the present invention. As illustrated, there are two inscribed circles $0$ and $01$, in which point $01$ and point $0$ has a certain eccentricity; circle $01$ rotates around point $0$. Assume that the radius of circle $0$ is R and the radius of circle $01$ is r, thus $R=\overline{0\,01}+r$, Also assume that point a will contact point A when circle $01$ is rotated. Thus, $\angle B\ 01a = R/r \times \angle B\ 0\ A,\ \overline{0\,01} + \overline{01\,a} = \overline{0\,A}$ $\therefore \widehat{BA} = \widehat{Ba}$ $\therefore n2R = R/r \times n2r$ $\widehat{BA} = n2R/360° \times \angle B0A$ $\widehat{BA} = n2r/360° \times \angle B01a$ If the circle $0$ is an internal gear and the circle $01$ is an external gear, thus $\angle BOA$ is a contained angle defined between the contact point of the external gear at the internal gear and the center of the internal gear after the external gear is rotated through a certain angle; $\angle B01a$ is the rotation angle of the external gear relative to the center $01$. Therefore, when the related conditions of the circle $01$ are known, the engaging points (for example point A) between the circles during the rotary motion of the circle $01$ can be obtained. By connecting the engaging points, the tooth form curve of the internal gear is obtained.

Figure 2:
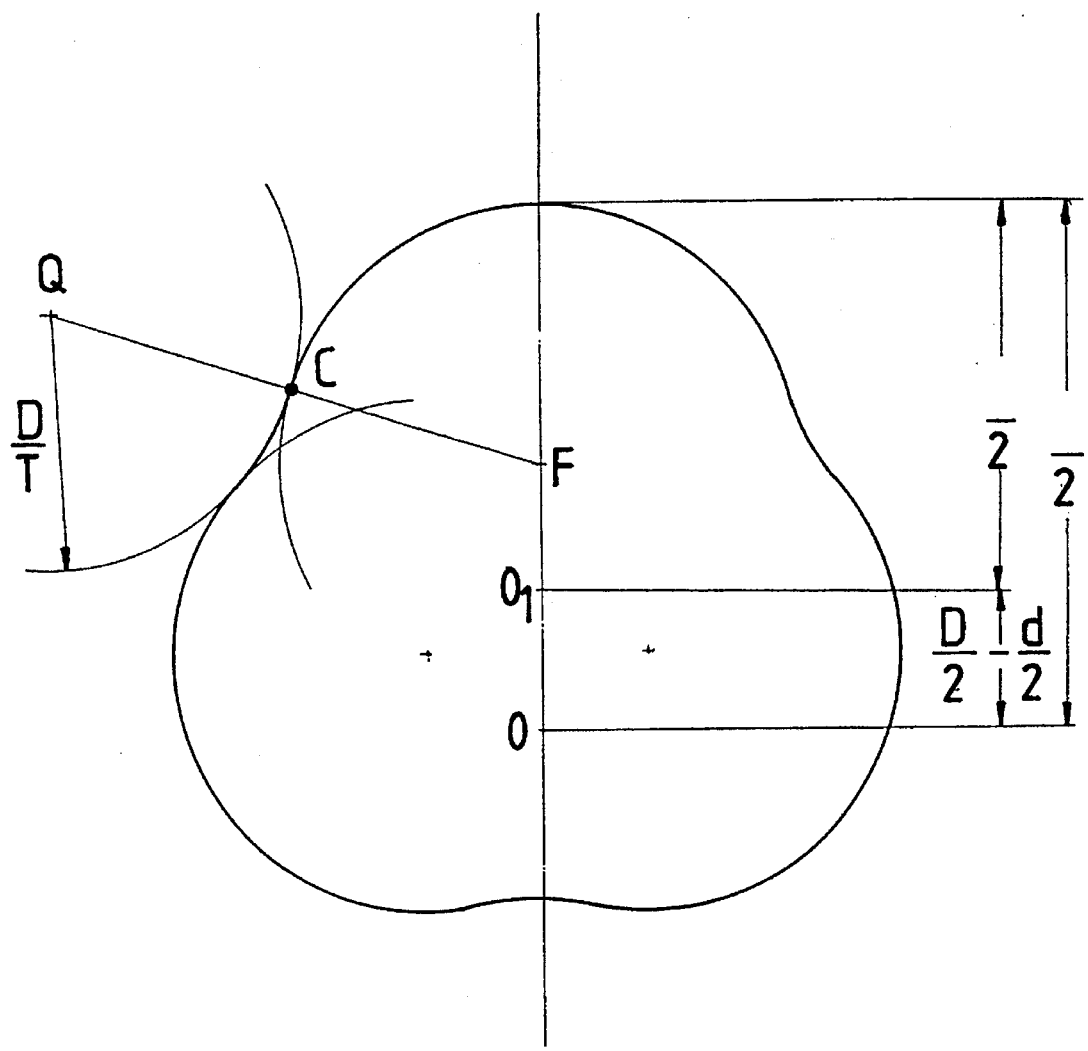
FIG. 2 is a schematic drawing explaining the formation of the tooth form of the external gear according to the present invention.

According to the aforedescribed principle, we can design the tooth form curves of the gears for reduction gears. When designing a gear, the following conditions are known:

T: number of teeth of the internal gear
t: number of teeth of the external gear
D: diameter of the tooth crest of the internal gear, therefore the tooth form curves of the internal gear and external gear can be obtained according to the procedure described hereinafter. The center $01$ of the external gear is obtained first. As illustrated in FIG. 2, M (Module)$=D/T=d/t$, therefore the diameter d of the tooth crest of the external gear can be obtained; the distance between the center of the external gear and the center of the internal gear $\overline{0\,01}=D/2-d/2$. Assume the center of the crest arc of the external gear is F, thus the radius of the crest arc $\overline{FC}=D/T$, therefore the location of the point F can be obtained and, the crest arc of the external gear can be drawn out. The root arc of each tooth of the external gear is of radius M which touches the two adjacent crest circles, therefore the point Q (the center of the crest arc) is obtained. By connecting the root arcs of the teeth of the external gear, the tooth form of the external gear is obtained. When the tooth form of the external gear is obtained, the tooth form of the internal gear can then be obtained. The tooth form curve of the internal gear is the curve which connects the engaging points of the internal gear at the crest arcs and root arcs of the teeth of the external gear. The method of getting the tooth form curve of the internal gear which engages with the crests of the teeth of the external gear is outlined hereinafter with reference to FIG. 3;

C: tangent point between the crest arc and root arc of the external gear

Figure 3:
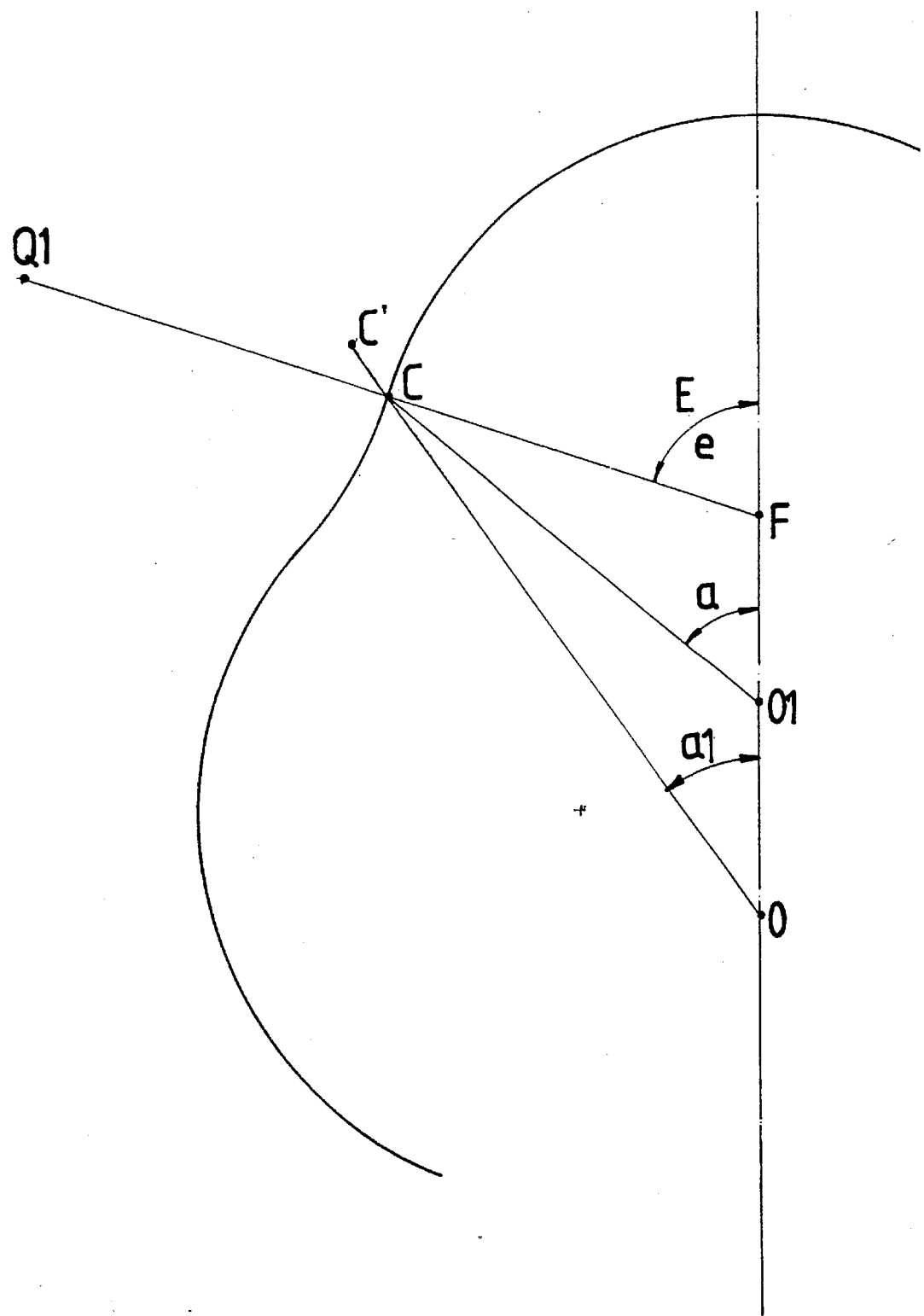
FIG. 3 is a schematic drawing explaining the formation of the tooth form of the internal gear in mesh with the tooth crests of the external gear according to the present invention.

E: contained angle defined between $\overline{FC}$ and the center line $\overline{O1F}$ e: contained angle defined by the engaging point at the crest arc relative to the point F, in which $e \leq E$ (in FIG. 3, e=E)

a: contained angle defined between $\overline{O1C}$ and the center line $\overline{O1F}$ In order to facilitate explanation, tangent point C is designated as the engaging point. As described, the tooth form curve of the internal gear is the curve which connects the engaging points of the internal gear at the crest arcs and root arcs of the teeth of the external gear, therefore the engaging points between the crests of the teeth of the external gear with the internal gear, the distance between the tangent points and the center of the external gear, and the contained angle defined by the center line must be obtained so as to further measure out the relative positions of the engaging points of the internal gear. When all engaging points of the internal gear and the external gear are obtained, they are respectively connected by lines, and therefore we can draw out the internal gear tooth form curve in mesh with the crests of the teeth of the external gear. The procedure to obtain the aforesaid data is outlined hereinafter:

T: number of teeth of the internal gear
t: number of teeth of the external gear
D: diameter of the tooth crest of the internal gear
d: diameter of the tooth crest of the external gear
e: contained angle of the engaging point at the crest arc relative to the center F of the crest arc of the external gear, in which $e \leq E$
a: contained angle defined between $\overline{O1C}$ and the center line $\overline{O1F}$, therefore $$a = \tan^{-1} \{(D/T \times \sin e) + [(d/2 - D/T) + D/T \times \cos e]\}$$

$$a1 = t/T \times a$$

in which, a1 is the contained angle defined between the line which passes through the engaging point of the internal gear and the center O of the internal gear, and the line which passes through the center of the internal gear and the center of the external gear. When to obtain the distance $\overline{OC'}$ between the internal gear engaging point C' and the center O of the internal gear, the equation is as follows:

$$\overline{O1C} = \sqrt{\{(D/T \times \sin e)2 + [(d/2 - D/T) + D/T \times \cos e]2\}}$$

$$\overline{OC} = \overline{O1C} + D/2 - d/2$$

Therefore, according to the angle e, the locations of the internal gear engaging points are obtained, and the tooth form of the internal gear in mesh with the external gear is obtained by connecting the engaging points.

Figure 4:
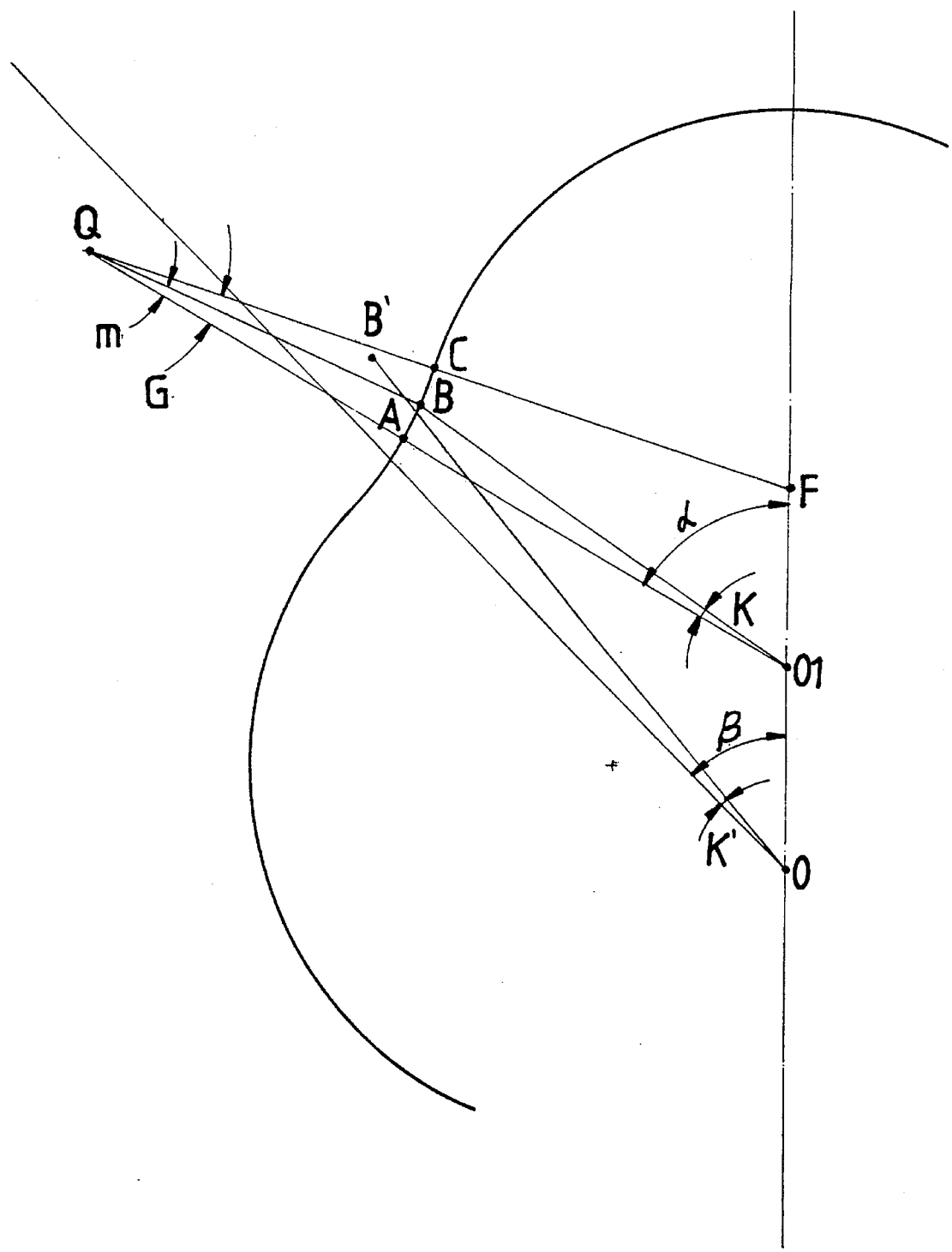
FIG. 4 is a schematic drawing explaining the formation of the tooth form of the internal gear in mesh with the roots of the teeth of the external gear.

The method of getting the tooth form curve of the internal gear which engages with the roots of the teeth of the external gear is outlined hereinafter with reference to FIG. 4. The contained angle K, which is defined between the line which passes through the engaging point B at the root arc of the external gear and the center O1 of the external gear and the $\overline{O1A}$, and the distance $\overline{O1B}$ must be obtained first, wherein the contained angle defined between the line $\overline{O1A}$ and the line $\overline{OO1}$ is the half tooth angle a of the external gear, therefore the contained angle defined between $\overline{O1A}$ and $\overline{O1F}$ is the line segment a. As illustrated, this line segment a is the line which connects the center O1 of the external gear and the center Q of the root arc. The equation is as follows:

T: number of teeth of the internal gear
t: number of teeth of the external gear
D: diameter of the tooth crest of the internal gear
d: diameter of the tooth crest of the external gear
G: contained angle between the tangent point C and the line Q A
m: angle of the engaging point at the root arc relative to the point Q, in which $m \leq G$, $a = 360°/2t$, $\beta = 360°/2T$;

$$K = \tan^{-1} \{(D/T \times \sin m) + [(d/2 - D/T) + D/T \times \cos a + \sqrt{((2D/T)2 - [(d/2 - D/T) \times \sin a]2) - (D/T \times \cos m)} ]\}$$

$$K' = t/T \times K$$

K' is the contained angle between the line segment $\beta$ defined by the line $\overline{OO1}$ and the engaging point at the internal gear.

$$\overline{O1B} = \sqrt{\{[(d/z - D/T) \times \cos a + \sqrt{[(2D/T)2 - ((d/z - D/T) \times \sin a)2 - D/T \cos m]} + (D/T \times \sin m)2\}}$$

$$\overline{OB'} = \overline{O1B} + D/z - d/z$$

$\overline{OB'}$ is the distance between the engaging point at the internal gear and the center O of the internal gear. Therefore, when the angle m of the engaging point at the root arc of the external gear is set, the location of the engaging point B' at the internal gear is obtained, and the tooth form of the internal gear is drawn out when all engaging points are connected.

Figure 5:
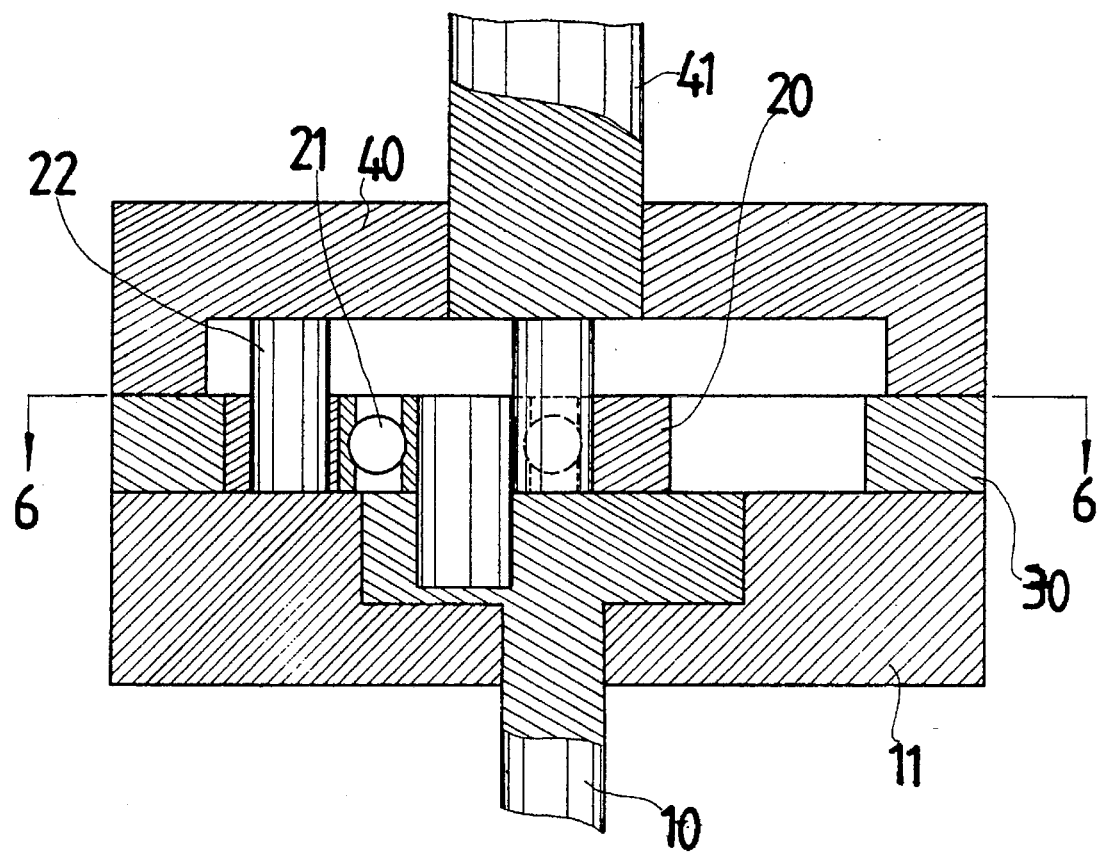
FIG. 5 is a sectional view showing the application of the present invention in a reduction gear.
Figure 6:
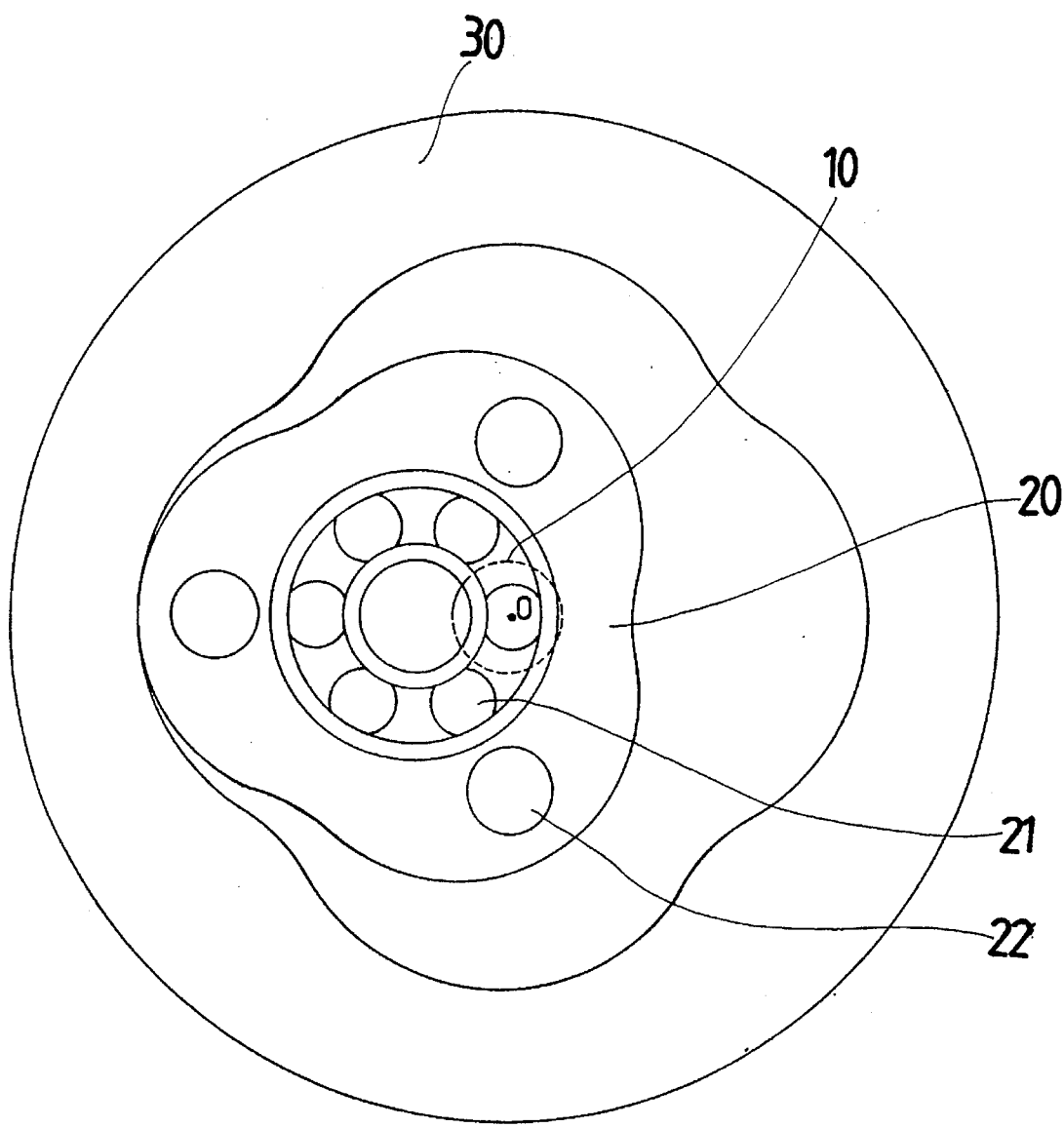
FIG. 6 is a sectional view taken along line 6—6 of FIG. 5.

FIGS. 5 and 6 show the application of the present invention in a reduction gear, in which the internal gear is fixed, the external gear moved around the internal gear. The center of the power input shaft 10 is referenced by O. The external gear 20 is mounted on the bearing disk 11, which is fixedly mounted around the power input shaft 10. There is an eccentricity between the center of the external gear 20 and the center O of the power input shaft 10. The internal gear 30 is disposed in a concentric manner relative to the power input shaft 10 for permitting the external gear 20 to be rotated within the internal gear 30. The external gear 20 is mounted with an axial bearing 21 and a plurality of flexible coupling shafts 22 equally spaced from the center. A wheel 40 is coupled to the flexible coupling shafts 22 to hold an output shaft 41. When operated, driving power from the power input shaft 10 is transmitted through the rotation of the external gear 20 to the output shaft 41 via the flexible coupling shafts 22, and the desired reduction ratio is obtained from the output shaft 41.

The aforedescribed gear structure is applicable for high reduction ratio as well a low reduction ration. Even if the difference of the number of teeth between the internal gear and the external gear is as low as one tooth, no clearance angle or the so-called interference will occur. Because the movement between the external gear 20 and the internal gear 30 is a relative rotary motion, the friction force between the contact surfaces of the gears is greatly reduced, and therefore the mechanical power transmission efficiency is greatly improved. The tooth forms of the external gear 20 and the internal gear 30 can be calculated by a computer and then the external gear 20 and the internal gear 30 can be quickly made by an automatic milling machine or molding machine. The thickness of the roots of the teeth of the internal gear 30 is relatively thicker than regular gears of the same size, therefore the structural strength of the internal gear 30 is strong and will not be damaged easily.

It is to be understood that the drawings are designed for purposes of illustration only, and are not intended as a definition of the limits and scope of the invention disclosed.

What is claimed is:

1. A gear structure comprising an internal gear and an external gear meshed together and moved relative to each other through a rotary motion, the radius of the root arcs of the teeth of said external gear being M and being the line of arc in tangent with the crest arcs of each two adjacent teeth, the tooth form curve of said internal gear being obtained by connecting all lines of arcs that are in tangent with the crest arcs of each two adjacent teeth, said M being the ratio between the diameter of the crest and the number of teeth, the tooth form curve of said internal gear being the curve which connects the engaging points at the crest arcs and root arcs of the teeth of the external gear, the center of said external gear being at the radius of said internal gear and spaced from the center of said internal gear at a distance, the tooth form of said internal gear which meshes with the crests of the teeth of said external gear being defined by the equations of:

$$a = \tan^{-1}\{(D/T \times \sin e) + [(d/2 - D/T) + D/T \times \cos e]\},$$

$$a1 = t/T \times a,$$

$$\overline{01\,C} = \sqrt{\{(D/T \times \sin e)2 + [(d/2 - D/T) + D/T \times \cos e]2\}},$$

$$\overline{0\,C} = \overline{01\,C} + D/2 - d/2,$$

in which:

T: number of teeth of said internal gear, t: number of teeth of said external gear, D: diameter of the tooth crest of said internal gear, d: diameter of the tooth crest of said external gear, 01: center of said external gear, 0: center of said internal gear, F: center of the crest arc of said external gear, C: tangent point between the crest arc and root arc of said external gear, E: contained angle defined between line $\overline{FC}$ and line $\overline{01\,F}$, e: contained angle of the engaging point at the crest arc relative to the center F of the crest arc of said external gear, being $\leq E$, a: contained angle defined between $\overline{01\,C}$ and the center line $\overline{01\,F}$, C': engaging point at the crest arc of said internal gear with the tangent point C, a1: contained angle defined between the line between the tangent point C' and the center point 0 of said internal gear and the line between the center point of said internal gear and the center point of said external gear; the tooth form of said internal gear which meshes with the roots of the teeth of said external gear being subject to the equations of:

$$K = \tan^{-1}\{(D/T \times \sin m) + [(d/2 - D/T) + D/T \times \cos a + \sqrt{((2D/T)2 - [(d/2 - D/T) \times \sin a]2) - (D/T \times \cos m)}\},$$

$$K' = t/T \times K,$$

$$\overline{01\,B} = \sqrt{\{[(d/z - D/T) \times \cos a + \sqrt{[(2D/T)2 - ((d/z - D/T) \times \sin a)2 - D/T \cos m]}} + (D/T \times \sin m)2\}},$$

$$\overline{0\,B'} = \overline{01\,B} + D/z - d/z,$$

in which:

T: number of teeth of the internal gear, t: number of teeth of the external gear, D: diameter of the tooth crest of the internal gear, d: diameter of the tooth crest of the external gear, Q: center of the crest arc of each tooth of said external gear, G: contained angle defined between the line between C and Q and the line $\overline{01\,Q}$, B: engaging point at the root arc of said external gear m: contained angle of the engaging point B relative to the point Q, $m \leq G$, a: half tooth angle of said external gear, equal to 360°/2t, 01 B: distance between the contact point at said external gear and the center 01 of said external gear, K: contained angle defined between $\overline{01\,B}$ and the line segment which defines the contained angle a with $\overline{01\,B}$, B': engaging point between B and thee root arc of said internal gear, βB: half tooth angle of said internal gear, equal to 360°/2T, K': contained angle defined the engaging point B' and the line segment which defines the contained angle β with $\overline{0\,01}$, 0 B': distance between the engaging point at said internal gear and the center 0 of said internal gear.

* * * * *